Nov. 19, 1957 — L. THOMISEE — 2,813,369
ANIMAL TRAP
Filed Feb. 13, 1956 — 2 Sheets-Sheet 1
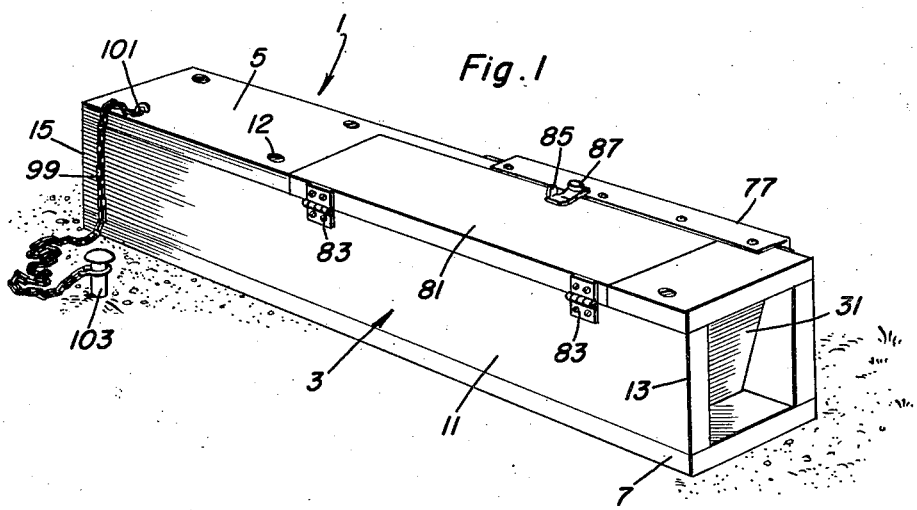
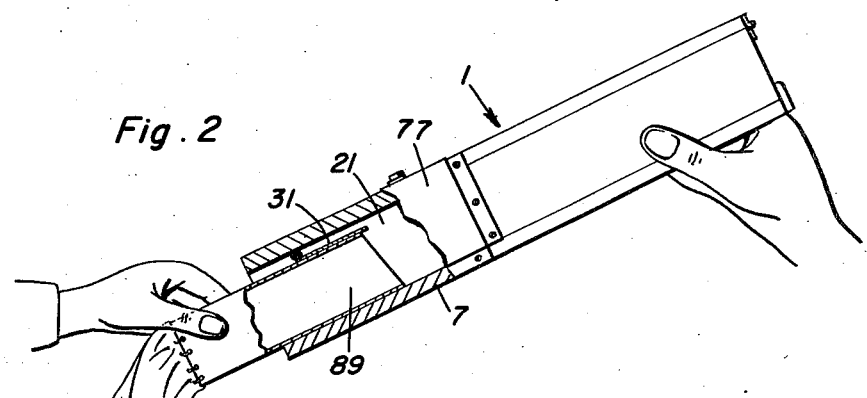
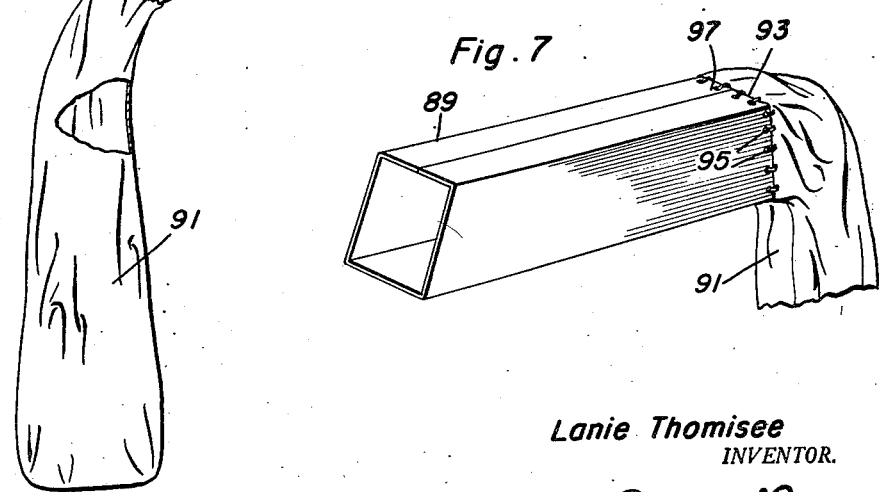
Lanie Thomisee
INVENTOR.

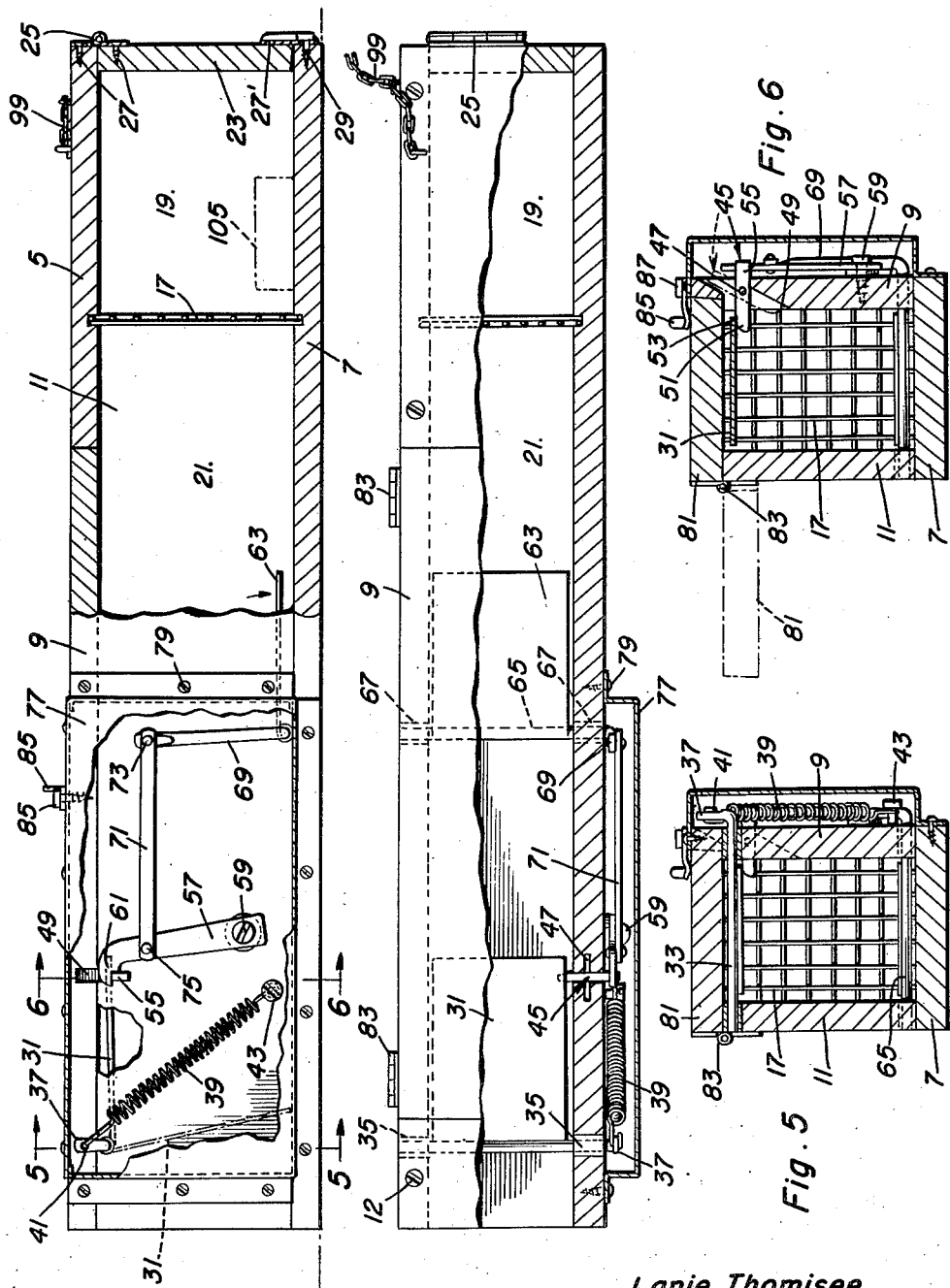

United States Patent Office 2,813,369
Patented Nov. 19, 1957

2,813,369
ANIMAL TRAP

Lanie Thomisee, Colfax, La., assignor of thirty-three and one-third percent to J. N. Fletcher and ten percent to W. T. McCain, Colfax, La.

Application February 13, 1956, Serial No. 564,983

2 Claims. (Cl. 43—61)

My invention relates to animal traps for trapping carnivorous fur-bearing animals especially of the smaller types.

The primary object of my invention is to provide a portable highly efficient trap for capturing such animals alive using as live bait smaller animals on which they prey.

Another object is to provide a trap for capturing such animals in a housing forming a trapping chamber in which the trapped animals cannot damage their fur.

Still another object is to provide a trap for capturing small fur-bearing animals by using live animals as bait in the trap and which embodies means for protecting the bait animal against being mutilated or killed by the trapped animal so that the bait animal may be used as bait repeatedly.

Yet another object is to provide improved means for tripping an entrance door to the trapping chamber for closing of the door by a tension spring, the tripping means being operative by a treadle in the trapping chamber and operatively connected to the door by means, which together with the door tensioning spring, are located outside the trapping chamber but enclosed for protection against snow, rain and the like.

A further object is to provide means for safely evacuating a trapped animal alive from the trapping chamber and for carrying alive away from the trap.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a view in perspective of my improved animal trap in the preferred embodiment thereof;

Figure 2 is a view in side elevation, partly in section, drawn to a reduced scale and illustrating the use of the evacuating means;

Figure 3 is an enlarged view in vertical longitudinal section, partly in side elevation and broken away and illustrating the animal trap set;

Figure 4 is a view in plan partly broken away and shown in horizontal section of the same;

Figure 5 is a view in vertical transverse section taken on the line 5—5 of Figure 3;

Figure 6 is a view in vertical transverse section taken on the line 6—6 of Figure 3 with a cleanout door for the trapping chamber shown open in broken lines; and Figure 7 is a fragmentary view in perspective of the evacuating means drawn to a larger scale.

Referring to the drawings by numerals, the animal trap of my invention, and which is designated generally by the numeral 1 comprises an elongated, rectangular housing 3 formed of solid top, bottom and right and left-hand side panels 5, 7, 9, 11, respectively, preferably of wood, the housing being provided with open front and rear ends 13, 15. The panels 5, 7, 9, 11 are suitably secured together as by screws 12.

A vertical partition 17 suitably fixed in the housing 3 rearwardly of the transverse center of the housing divides the same into a rear live bait confining chamber 19 opening out of said rear end 15, and a substantially longer front trapping chamber 21 opening out of said front end 13. The partition 17 is formed of reticulated material, such as heavy gauge mesh wire, so that an animal trapped in the trapping chamber 21 may see the live bait animal but be blocked from access thereto for mutilating or killing the same.

An upwardly and outwardly opening door 23 is provided at the rear end 15 of the housing 3 for opening and closing said end 15 to open and close the live bait chamber 19, and is hinged by a suitable hinge 25 and screws 27 to the top panel 5 for opening and closing. A conventional fastener 27' pivoted on a screw 29 in the bottom panel 7 holds the door 23 closed.

A vertically swingable door 31, of sheet metal, is provided in the front end of the trapping chamber 21 for opening and closing said end and the trapping chamber 21 and is mounted by means of a cross-shaft 33 in the upper portion of the trapping chamber 21 journaled at its rear ends in bushings 35 fixed in the side panels 9, 11 so that said door, which may be connected in any suitable manner to the shaft 33, is swingable upwardly and rearwardly into open horizontal position in the top of the trapping chamber 21 but swingable downwardly and forwardly to close the front end of said trapping chamber. In its closed position, the door 31 is vertically inclined and engages the bottom panel 7 to prevent it from being pushed open forwardly by an animal trapped in the trapping chamber 21.

The door 31 is spring-tensioned for closing by means of a terminal crank arm 37 fixed on one end of the shaft 33, adjacent the right-hand panel 9, and a tension spring 39, also adjacent said panel 9, the spring 39 being connected at one end as at 41 to the crank arm 37 and extending downwardly and rearwardly therefrom with its other end attached to a screw 43 in said panel 9.

Means is provided for releasably holding the door 31 open and tripping the same for closing and which will now be described.

A door holding and releasing tripping lever 45 extends transversely through the upper portion of the right-hand panel 9 and its pivoted intermediate its ends by a transverse pivot pin 47 in said panel 9 for vertical swinging in a diagonal slot 49 in said panel into horizontal door-holding position and into vertical door-releasing tripping position. In the door-holding position thereof an inner end 51 of said lever 45 extends into the trapping chamber 21 and underlies and supports an adjacent 53 of the door 31 to hold said door up and open, and an outer end 55 of said lever extends outwardly of the right-hand panel 9, whereas, in its door-releasing position, shown in dotted lines in Figure 6, said lever 45 swings against the bottom of the slot 49 with its inner end 51 clear of said edge 53 but projecting into the trapping chamber 21 sufficiently for manipulation by hand to set said lever 45 into holding position.

At upright trigger arm 57 is pivoted at its lower end, as at 59, on the right-hand side panel 9 in the rear of the door-holding and releasing lever 45 for swinging forwardly and rearwardly relative to said lever and is provided at its upper end with a forwardly extending straight edge beak 61 which, when the said arm 57 is swung forwardly hooks over the outer end 55 of the door-holding and releasing lever 45 to retain said lever in door-holding position in opposition to downward pressure exerted by the door 31 under the influence of the spring 39. The trigger arm 57 when swung rearwardly releases and trips the tripping lever 45 for swinging into door-releasing position for closing of the door by the spring 31, so that said lever 45 trips the door.

A treadle 63 in the bottom and mid-portion of the trapping chamber 1, and rearwardly of the trigger arm 57, is suitably fixed to and extends rearwardly from a rock shaft 65 journaled at its ends in bushings 67 in the side panels 9, 11, transversely of said chamber 21, and is swingable manually vertically into a horizontal raised position for depression into a lowered position by an animal stepping thereon, and whereby to rock said shaft. The rock shaft 65 forms part of operating connections between the treadle 63 and trigger arm 57 including a terminal, upstanding crank arm 69 on said shaft 65 and a link 71 having its ends pivoted, as at 73, 75 to the crank arm 69 and the trigger arm 57, respectively. Depression of the treadle 63 is limited by engagement of said treadle with the bottom panel 7.

The crank arm 37, spring 39, trigger arm 57, crank arm 69 and link 71 are disposed outwardly of the right-hand panel 9 alongside thereof to dispose these operating parts outside the trapping chamber 21 and prevent the fur of the trapped animal from being damaged by contact therewith.

A flanged, dished guard plate 77 secured by screws 79 to the side panel 9 and top panel 5 covers the outer end of the door-holding and releasing tripping lever 45, together with the spring 39, crank arms 37, 69, trigger arm 57, and link 71 to protect the same against rust or fouling by rain, snow, ice or dirt.

A cleanout door 81 for the trapping chamber 21 is provided in the top panel 5 and is hinged, as at 83, to the left-hand side panel 11 for opening to provide for access to said chamber 21. A conventional fastener 85 pivoted on a screw 87 on the top panel 5 secures the cleanout door 81 in closed position.

The means for evacuating a trapped animal from the trapping chamber 21 comprises a rectangular, tubular, metal chute 89 of a size to be slid with a friction fit partway into the front end 13 of the housing 3, whereby to extend said chute rearwardly partway into the trapping chamber 21. A stout bag 91 of any suitable material, such as leather, has its mouth 93 laced, as at 95, to a rear end 97 of the chute 89.

A chain 99 is attached at one end to an eye screw 101 on the housing 3 and provided with a stake 103 on its other end for anchoring the trap 1 in a selected location.

To set the described trap, the cleanout door 81 is first opened into the position shown in broken lines in Figure 6. The door 31 is then pushed into open position by a hand inserted through the front end 15 of the housing 3 into the trapping chamber 21 and the door-holding and releasing tripping lever 45 is manipulated by its front end 51 with a finger of the hand to swing said lever into the door-holding position, as shown in Figures 3, 4, 5 and 6 in full lines. Then with said lever held in door-holding position by the finger, the treadle 63 is raised by the other hand inserted downwardly into the trapping chamber 21. As has already been described, raising of the treadle 63 causes the trigger arm 57 to be swung forwardly to position its beak 61 over the outer end 55 of said lever 45 to hold or retain said lever 45 in door-holding position. An animal entering the trap and depressing the treadle 63 causes the trap to be sprung instantly for the reason that slight depression of the treadle 63 causes the trigger arm 57 to be moved rearwardly and release the door-holding and releasing tripping lever 45, the trigger arm 57 tripping said lever 45 which then trips the door 31 for closing by the spring 39, as shown in full lines in Figure 1 and in dotted lines in Figure 3.

A trapped animal is evacuated from the trapping chamber 21 by sliding the chute 89 rearwardly into said chamber through the front end 13 of the housing 3 and holding the chute with one hand while tilting the housing 3 downwardly and forwardly as shown in Figure 2 to cause the trapped animal to slide down the chute 89 into the bag 91. Then the animal may be safely carried in the bag 91, using the chute 89 as a handle, to a desired location after which the bag 91 may be unlaced from the chute and the animal dumped out of the mouth 93 of the bag 91 into a cage or the like.

Live bait may be placed in the bait-confining chamber 19 either before or after setting of the trap to feed upon food indicated at 105 and thereby be kept alive. If a rodent is used as bait, a cage, not shown, may be used for placing such bait in the bait-confining chamber 19.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the invention as claimed.

What is claimed as new is as follows:

1. An animal trap comprising an elongated housing having a closed top, bottom, and sides and an open front end, a vertical partition of reticulated material dividing said housing into a rear live bait chamber and a front trapping chamber opening out of said front end and in which a trapped animal may view the live bait through said partition and be blocked by the partition against access to the bait, an entrance door for the trapping chamber in the same adjacent said front end, a transverse shaft in the upper portion of said chamber fixed to and suspending said door and having its end journaled in said sides for rocking of said shaft in opposite directions for swinging said door to open and close the same, spring means tensioning said shaft for rocking in a direction to close the door, a door holding and tripping lever pivoted in one side of the housing for manual swinging beneath the door to hold the same open and swingable into door releasing and tripping position, a treadle pivoted in the trapping chamber for manual raising and depression by an animal, and trip means operative by raising of said treadle to hold said lever against swinging and to trip said lever when the treadle is depressed, said trip means comprising a vertical trigger arm pivoted on one side of the housing for swinging in opposite directions into and from overlying positions relative to said lever, and operating connections between said treadle and arm for swinging said arm by raising and depression of the treadle.

2. An animal trap comprising an elongated housing having a closed top, bottom, and sides and an open front end, a vertical partition of reticulated material dividing said housing into a rear live bait chamber and a front trapping chamber opening out of said front end and in which a trapped animal may view the live bait through said partition and be blocked by the partition against access to the bait, an entrance door for the trapping chamber in the same adjacent said front end, a transverse shaft in the upper portion of said chamber fixed to and suspending said door and having its end journaled in said sides for rocking of said shaft in opposite directions for swinging said door to open and close the same, spring means tensioning said shaft for rocking in a direction to close the door, a door holding and tripping lever pivoted in one side of the housing for manual swinging beneath the door to hold the same open and swingable into door releasing and tripping position, a treadle pivoted in the trapping chamber for manual raising and depression by an animal, and trip means operative by raising of said treadle to hold said lever against swinging and to trip said lever when the treadle is depressed, said spring means and said trip means being disposed outwardly of one side of the housing to prevent the same from injuring an animal in the trapping chamber, and a cover plate for said spring means and trip means attached to said housing.

References Cited in the file of this patent

UNITED STATES PATENTS

| | | |
|---|---|---|
| 153,722 | Pangle | Aug. 4, 1874 |
| 1,372,663 | Albers et al. | Mar. 21, 1921 |
| 1,715,861 | Owen | June 4, 1921 |
| 2,243,367 | Abriol | May 27, 1941 |
| 2,505,662 | Broone | Apr. 25, 1950 |
| 2,529,589 | Biery | Nov. 14, 1950 |
| 2,541,681 | Andrews | Feb. 13, 1951 |